(12) United States Patent
Garino (10) Patent No.: US 12,187,104 B2
(45) Date of Patent: Jan. 7, 2025

(54) GUIDE RAIL, DEVICE AND METHOD FOR THE INJECTION MOULDING OF THIS RAIL

(71) Applicant: Cooper-Standard France, Vitré (FR)

(72) Inventor: Thierry Garino, Taillis (FR)

(73) Assignee: Cooper-Standard France (FR)

( * ) Notice: Subject to any disclaimer, the term of this patent is extended or adjusted under 35 U.S.C. 154(b) by 58 days.

(21) Appl. No.: 17/632,642

(22) PCT Filed: Jul. 29, 2020

(86) PCT No.: PCT/EP2020/071343
§ 371 (c)(1),
(2) Date: Feb. 3, 2022

(87) PCT Pub. No.: WO2021/028220
PCT Pub. Date: Feb. 18, 2021

(65) Prior Publication Data
US 2022/0281296 A1    Sep. 8, 2022

(30) Foreign Application Priority Data
Aug. 14, 2019  (FR) ........................................ 1909216

(51) Int. Cl.
| | |
|---|---|
| *B29C 45/26* | (2006.01) |
| *B29C 45/44* | (2006.01) |
| *B60J 1/17* | (2006.01) |
| *B60J 5/04* | (2006.01) |
| *E05D 15/16* | (2006.01) |
| *B29L 31/00* | (2006.01) |

(52) U.S. Cl.
CPC ............ *B60J 5/0402* (2013.01); *B29C 45/26* (2013.01); *B29C 45/44* (2013.01); *B60J 1/17* (2013.01); *E05D 15/165* (2013.01); *B29L 2031/005* (2013.01)

(58) Field of Classification Search
CPC .. B60J 1/17; B60J 1/16; E05D 5/0402; E05D 15/165; B29L 2031/005; B29L 2023/00; B29C 45/261; B29C 45/33; B29C 45/36; B29C 45/2614
USPC ................................................... 49/348, 349
See application file for complete search history.

(56) References Cited

U.S. PATENT DOCUMENTS 4,418,498 A * 12/1983 Wanlass ................ E05F 11/382
                                                                    49/425
4,483,100 A * 11/1984 Blankenburg ........... B60J 10/79
                                                                    49/374
(Continued)

FOREIGN PATENT DOCUMENTS

| CN | 2664938 Y | 12/2004 |
| CN | 203418725 U | 2/2014 |

(Continued)

OTHER PUBLICATIONS

International Search Report for PCT/EP2020/071343 dated Oct. 21, 2020. 3 pgs.

*Primary Examiner* — Jerry E Redman
(74) *Attorney, Agent, or Firm* — Lerner David LLP (57) ABSTRACT

A guide rail made from an injected plastic material includes at least one portion having the shape of a tubular profile longitudinally split over at least one portion of the length. The guide rail is configured to be straight or curved in the shape of an arc of a circle.

10 Claims, 7 Drawing Sheets

(56) References Cited

U.S. PATENT DOCUMENTS

| | | | | |
|---|---|---|---|---|
| 4,648,205 A | * | 3/1987 | Ono | B60J 10/79 |
| | | | | 49/374 |
| 4,777,767 A | * | 10/1988 | Warren | B60J 10/74 |
| | | | | 49/374 |
| 4,823,511 A | * | 4/1989 | Herliczek | B60J 10/74 |
| | | | | 49/404 |
| 4,934,099 A | * | 6/1990 | Maekawa | E05F 15/689 |
| | | | | 49/502 |
| 5,062,240 A | * | 11/1991 | Brusasco | B60J 5/0416 |
| | | | | 296/153 |
| 7,624,537 B2 | * | 12/2009 | Moreau | B60J 1/17 |
| | | | | 49/502 |
| 11,299,019 B2 | * | 4/2022 | Veille | B60J 5/0402 |
| 2013/0061526 A1 | * | 3/2013 | Grudzinski | B60J 10/79 |
| | | | | 49/404 |
| 2013/0061529 A1 | * | 3/2013 | Grudzinski | B60J 10/7775 |
| | | | | 49/404 |
| 2014/0175249 A1 | | 6/2014 | Becker et al. | |
| 2016/0263312 A1 | | 9/2016 | Junod et al. | |
| 2020/0031213 A1 | * | 1/2020 | Charge | B60J 1/17 |

FOREIGN PATENT DOCUMENTS

| | | |
|---|---|---|
| CN | 103717444 A | 4/2014 |
| DE | 2331785 A1 | 1/1975 |
| DE | 102015008914 A1 | 1/2017 |
| JP | H0858967 A  * | 5/1996 |
| WO | 2015063576 A1 | 5/2015 |
| WO | 2019141675 A1 | 7/2019 |

\* cited by examiner

GUIDE RAIL, DEVICE AND METHOD FOR THE INJECTION MOULDING OF THIS RAIL

CROSS-REFERENCE TO RELATED APPLICATIONS

The present application is a national phase entry under 35 U.S.C. § 371 of International Application No. PCT/EP2020/071343 filed Jul. 29, 2020, which claims priority from French Application No. 1909216 filed Aug. 14, 2019, all of which are incorporated herein by reference.

FIELD OF THE INVENTION

The invention relates to the field of motor vehicle equipment.

The present invention relates to a guide rail of a device for guiding a sliding window in a door of a motor vehicle, a device for manufacturing this rail by injection and the method for manufacturing this rail using this device for manufacturing.

PRIOR ART

A motor vehicle door comprises a caisson that is extended at its upper portion by a frame. This frame comprises two uprights, namely a front upright and a rear upright, connected together by a crosspiece. This frame delimits with the caisson, an opening. A window is mounted slidingly in the door in such a way as to close off or not this opening. At least one device for guiding is disposed either in the front upright, or in the rear upright to guide this window during the movement thereof.

Figure 1:
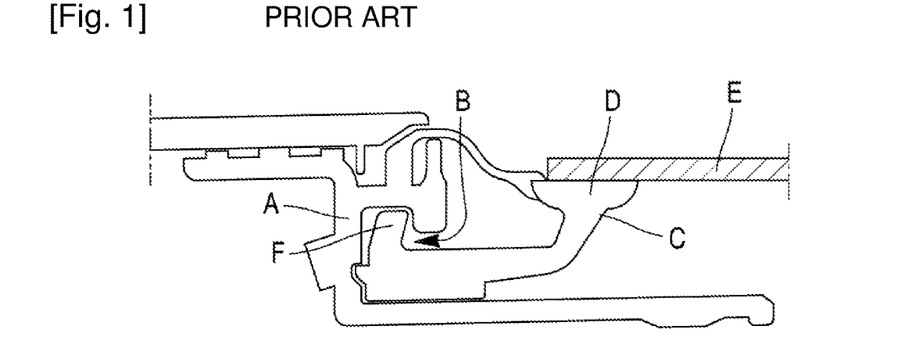
FIG. 1 is a cross-section view of a guide rail in accordance with the prior art, wherein a guide shoe is inserted fastened to the window that is to be slid.

Each device for guiding comprises a guide rail and at least one sliding guide shoe. The accompanying FIG. 1 shows, seen as a cross-section, an example of such a device for guiding known in the prior art.

It can be seen that the guide rail A has the form of a continuous hollow profile provided with a longitudinal slot B. The guide shoe C has an end D fastened onto the inner face of the window E and another end F received and guided in the channel of said guide rail.

This guide rail can be obtained by extrusion. However, although the known methods of extrusion make it possible to obtain guide rails with a C-shaped cross-section, the latter are necessarily straight or very slightly curved. However the invention has for purpose to produce any type of rails, including a rail that is more heavily arched.

Figure 2:
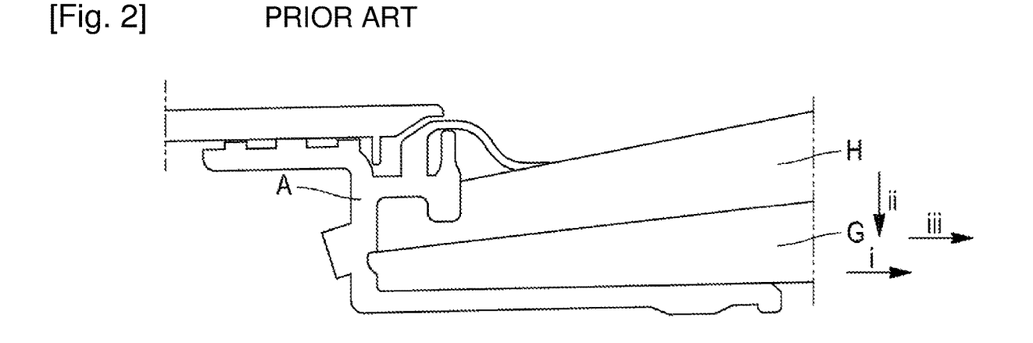
FIG. 2 is a cross-section view of the guide rail of FIG. 1 and of certain portions of the mould that were used for the injection thereof.

The guide rail can also be obtained by injection moulding. However, in this case, as the channel of the guide rail does not have any draft angles, this rail cannot be unmoulded directly. The mould must therefore be adapted so as to have two drawers G and H, as shown in the accompanying FIG. 2. During the unmoulding, the lower drawer G is first of all removed (arrow i), then the upper drawer H is lowered (arrow ii) then removed (arrow iii).

However, if it is sought to carry out a guide rail that is simultaneously arched and has a cross-section in the shape of a C, it is then no longer possible to proceed with unmoulding as explained hereinabove.

It is known according to the state of the art, the technique of injection with a projectile (known under the acronym "PIT" for "Projectile Injection Technique"), the technique of injection with water, (known under the acronym "WIT" for "Water Injection Technique") and the technique of injection with gas, (known under the acronym "GIT" for "Gas Injection Technique"), which consist respectively in sending a projectile of calibration, water or gas, in the injected melted plastic material, to form hollow bodies. However, these methods do not make it possible to precisely control the shape of the inside hollow portion of this body, or its surface condition. Consequently, these methods are not adapted to the carrying out of a guide rail of which the function is indeed to guider a sliding guide shoe as precisely as possible.

Finally, regardless of the aforementioned method of obtaining used, the rail obtained must then be assembled with additional parts, such as support profiles or structural profiles, which cannot be obtained as a single piece with said rail.

It is known according to document DE 2331 785 a straight guide rail, inside of which is inserted a part made of plastic material manufactured by injection and that facilitates the sliding of the seat.

It is finally known according to document WO 2015/063576 a device for moulding a miniature portable pump, which makes it possible to manufacture the body of the pump. However, this body does not have a longitudinal groove.

DISCLOSURE OF THE INVENTION

The invention therefore has for purpose to overcome the aforementioned disadvantages of the prior art and to propose a straight or curved guide rail, provided with a slot over at least one portion of its length and obtained by injection, a device and a method for manufacturing via injection the aforementioned guide rail.

The invention also has for purpose to obtain, via an injection method, a guide rail such as mentioned hereinabove, that does not have any draft angles and of which the cross-section has a shape such that it does not allow for the simple unmoulding via extraction of the mould through the slot.

To this effect, the invention relates to a guide rail, in particular for guiding a guide shoe fastened to the sliding window of a motor vehicle door.

In accordance with the invention, this guide rail is made from an injected plastic material, and it comprises at least one portion having the shape of a tubular profile, which has a recess over its entire length and which is provided over at least one portion of its length with a longitudinal slot and this tubular profile is curved in the shape of an arc of a circle, this arc of a circle being inscribed in a plane, in such a way that the outer surface of said tubular profile has a concave longitudinal zone, an opposite convex longitudinal zone and two opposite lateral longitudinal zones, with each lateral longitudinal zone extending from the concave zone to the convex zone, and in that said longitudinal slot extends along one of the two lateral longitudinal zones or along the concave longitudinal zone.

Such a guide rail has the aforementioned desired characteristics.

According to other advantageous and non-limiting characteristics of the invention, taken alone or in combination:
- the recess has the shape of a portion of a torus with a circular cross-section.
- the curved tubular profile has a radius of curvature comprised between 300 mm and infinity.
- the tubular profile comprises at least one longitudinal wing that extends from the outer surface of this tubular profile and which forms a single piece with said tubular profile.

the guide rail is made from at least one composite material or not.

said material is chosen from polypropylene (PP), polyoxymethylene (POM), acrylonitrile butadiene styrene (ABS), acrylonitrile butadiene styrene/polycarbonate (ABS/PC), poly methyl methacrylate (PMMA), acrylonitrile styrene acrylate (ASA), or styrene acrylonitrile.

the guide rail is a guide rail of a guide shoe fastened to the sliding window of a motor vehicle door.

The invention also relates to an injection moulding device of the aforementioned rail.

In accordance with the invention, this device comprises:

a mould comprising a male portion and a female portion together delimiting a moulding cavity the shape of which corresponds to that of the contour of said guide rail to be moulded, said female portion comprising at least two parts, said moulding cavity comprising a portion, referred to as "moulding cell", the shape of which corresponds to that of said at least one portion of the guide rail having the shape of said tubular profile, the male portion of the mould comprising at least one core for the formation of the recess of the rail and an intermediate part for the formation of said longitudinal slot of the rail, a device for injecting under pressure inside said moulding cavity, plastic material intended for manufacturing said guide rail, and a device for extracting the core of said male portion outside the moulding cell of the mould, this extraction device being configured to extract the core from one of the two ends of the moulding cell.

According to other advantageous and non-limiting characteristics of the invention, taken alone or in combination:

the core is curved in the shape of an arc of a circle, this arc of a circle being inscribed in a plane and the extraction device is configured for displacing said core from one of the two ends of the moulding cell in a trajectory of an arc of a circle of the same radius as the radius of the arc of a circle of this core.

the outer surface of the core has a concave longitudinal zone, an opposite convex longitudinal zone and two opposite lateral longitudinal zones, with each lateral longitudinal zone extending from the concave zone of the core to the convex zone of the core and either the concave zone of the core, or one of the two lateral longitudinal zones extends towards the exterior and over at least one portion of the length of said core by said intermediate part.

the recess of the guide rail has the shape of a portion of a torus with a circular cross-section, characterised in that said core has the shape of a circular cross-section torus and in that the diameter of this cross-section corresponds to the inner diameter of the recess of the profile of the guide rail to be moulded.

the male portion of the mould further comprises a cooperation part with said extraction device, said core extending towards the exterior and over at least one portion of its length by said intermediate part of the formation of the slot of the rail, the thickness of this intermediate part corresponds to the thickness of the guide rail to be obtained.

said cooperation part comprises a rack, in that said extraction device comprises a pinion driven in rotation by a displacement device, this pinion meshing with the teeth of the rack, in such a way as to displace this rack, and jointly the core of the male portion of the mould, in such a way that the core exits from the moulding cell.

the rack is in the shape of an arc of a circle, in that the pinion is disposed in such a way that its axis of rotation is parallel to the central axis of the circle of the core in the shape of an arc of circle of the male portion of the mould and the pinion meshes with the teeth of the rack in such a way as to displace this rack and jointly the core in a trajectory in the shape of an arc of a circle of the same radius as the radius that joins the central axis of the circle of the core in the shape of an arc of a circle to the centre of the cross-section of said core, in such a way as to cause the core to exit outside the moulding cell.

Finally, the invention also relates to a method of moulding the aforementioned guide rail.

In accordance with the invention, this method comprises the steps consisting in:

injecting plastic material under pressure inside the moulding cavity of the mould of the aforementioned moulding device, hardening this plastic material, actuating the extraction device in such a way as to slide the male portion of the mould outside the female portion of said mould in order to extract it therefrom, separating the different parts of the female portion of the mould in order to unmould the guide rail obtained.

DESCRIPTION OF THE FIGURES

Other characteristics, purposes and advantages of the invention shall appear in the following description, which is purely for the purposes of information and is not limiting, and which must be read with respect to the accompanying drawings wherein.

In all of the figures, identical elements bear identical references.

DETAILED DESCRIPTION OF THE INVENTION

Figure 3:
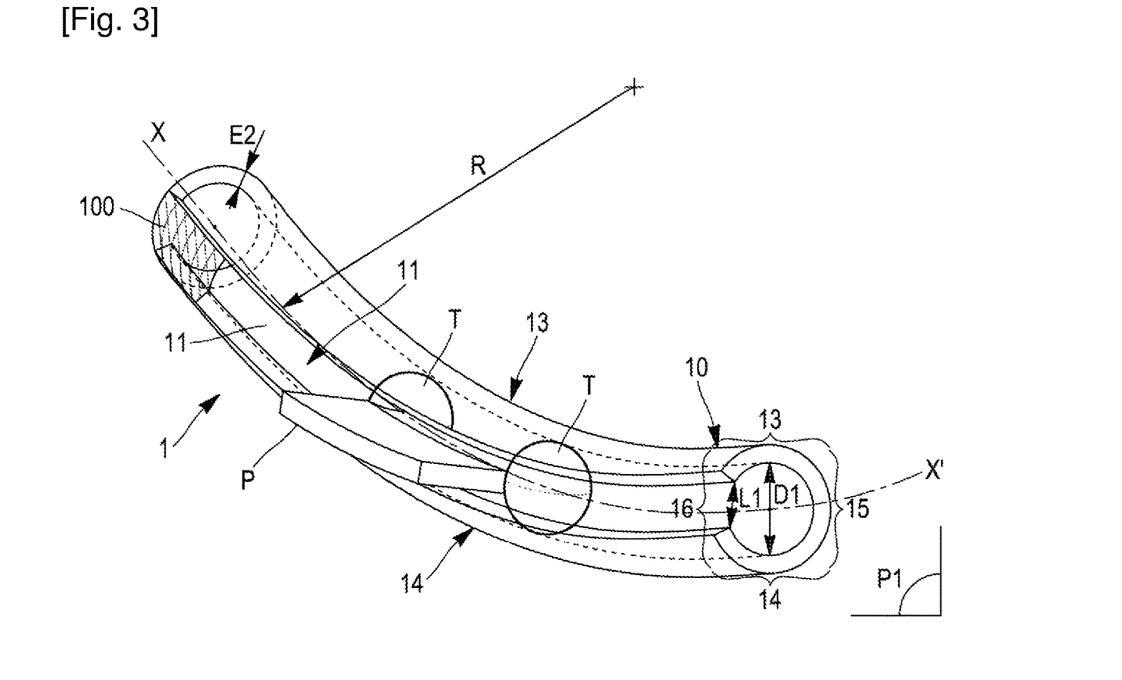
FIG. 3 is a perspective view of a first embodiment of a guide rail in accordance with the invention and an alternative (hatched) as well as a guide shoe disposed inside the latter.

The guide rail 1 in accordance with the invention comprises at least one portion having the shape of a tubular profile 10. A possible embodiment of this tubular profile is such as shown in FIG. 3.

In this example, the profile 10 has over its entire length, a recess 11 of circular cross-section. Furthermore, the profile 10 is provided with a longitudinal slot 12 that extends over its entire length. The slot 12 opens both onto the outside of the rail and inside the recess 11. The tubular profile 10 therefore has a cross-section in the shape of a C.

The profile 10 can however have a section of another shape, for example a shape of an ellipse, a square shape or a rectangular shape.

It can also be closed off at one of its two ends.

Finally, the slot 12 may not extend over the entire length of the profile 10 and stop before one of the two ends of the latter, preferable at a short distance from this end (see for example the hatched portion 100 of the rail 10 wherein there is no slot 12).

Figure 4:
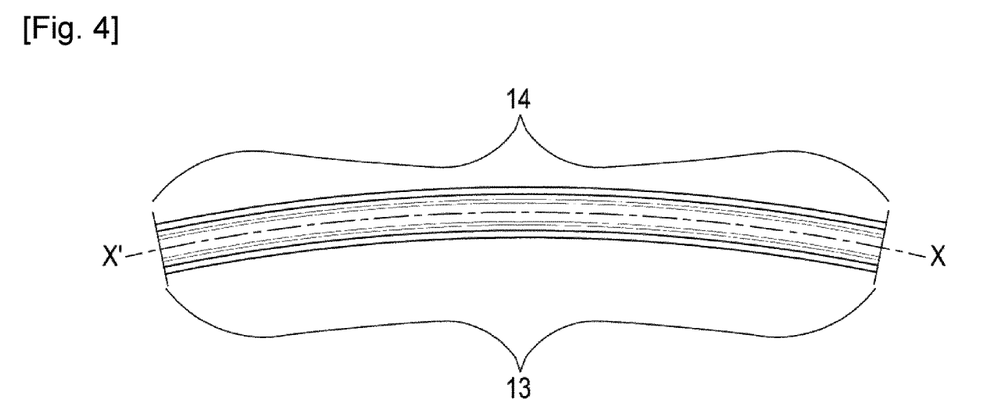
FIG. 4 is a front view of the guide rail of FIG. 3 after pivoting 180°.
Figure 5:
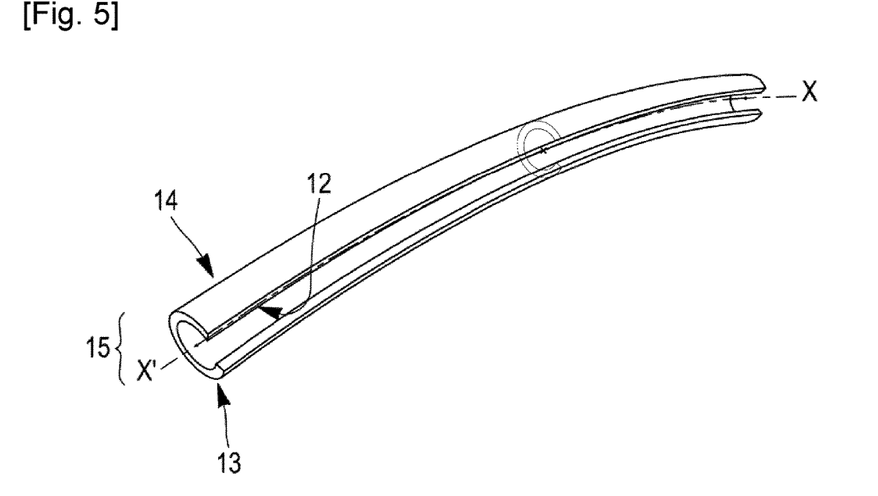
FIG. 5 is a perspective view of the guide rail of FIG. 3 after pivoting 180°.

Furthermore, regardless of its section, the profile 10 is preferably curved in the shape of an arc of a circle in such a way as to have over its entire length, a concave longitudinal zone 13, an opposite convex longitudinal zone 14, and two opposite lateral longitudinal zones 15 and 16, (also see FIGS. 4 and 5). Each one of the two lateral longitudinal zones 15 and 16 extends from the concave zone 13 to the convex zone 14.

Figure 6:
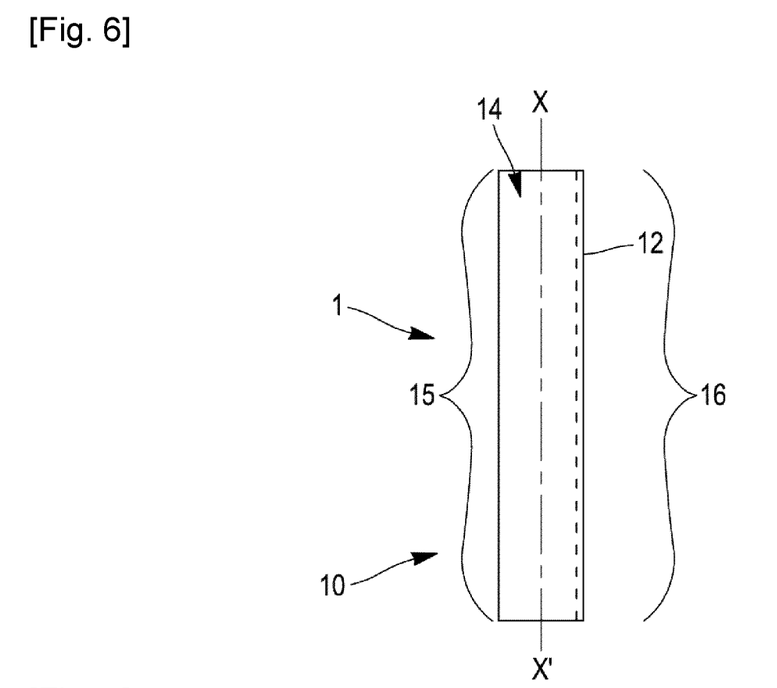
FIG. 6 is a top view of the guide rail of FIG. 5, on a reduced scale.

However, note that seen from above and as shown in FIG. 6, the curved tubular profile 10 is straight, i.e. the arc of circle of its bending is located in a plane.

The profile 10 can also not be curved at all.

When the profile 10 is curved, the recess 11 of FIG. 3 has the shape of a portion of a torus. When the rail 10 has a cross-section other than circular, the recess 11 is then of an annular shape but with said corresponding cross-section.

When the tubular profile 10 is curved, the longitudinal slot 12 extends either along the concave longitudinal zone 13, or along one of the two lateral longitudinal zones 15 or 16, (here the zone 16 in figures), by then being disposed preferably at mid-distance or substantially at mid-distance between the convex longitudinal zone 14 and the concave longitudinal zone 13.

The tubular profile 10 has a radius of curvature R, preferably comprised between 300 mm and infinity, more preferably between 1000 mm and 2000 mm, in order to facilitate the unmoulding of the rail 1.

The tubular profile 10 has a central longitudinal axis X-X' which is therefore either straight, or in the shape of an arc of a circle following the shape of the profile, this arc of a circle being inscribed in a plane P1.

The guide rail 1 allows for the guiding of a guide shoe P, such as for example the one shown in FIG. 3 but which is not part of the invention. Such a guide shoe P is provided with two spherical heads T. These two heads T penetrate and slide in the recess 11 and the body of the guide shoe P passes through the longitudinal slot 12.

As can be seen in FIG. 3, due to the C-shape of the cross-section of the profile 10, the width L1 of the slot 12 is less than the inner diameter D1 of the recess 11. In other terms, the profile 10 does not have any draft angles and cannot be unmoulded by taking out the male portion from the mould that was used for the manufacture thereof through the slot 12. This also applies to the profiles 10 of the invention of which the cross-section has a shape other than circular.

In its most basic form, the guide rail 1 in accordance with the invention comprises solely a tubular profile 10. However, it can also comprise at least one longitudinal wing 17 that extends from the outer surface of the profile 10 and which forms a single piece with this profile 10. The term "single piece" means that it is integrally formed with the profile 10.

Figure 7:
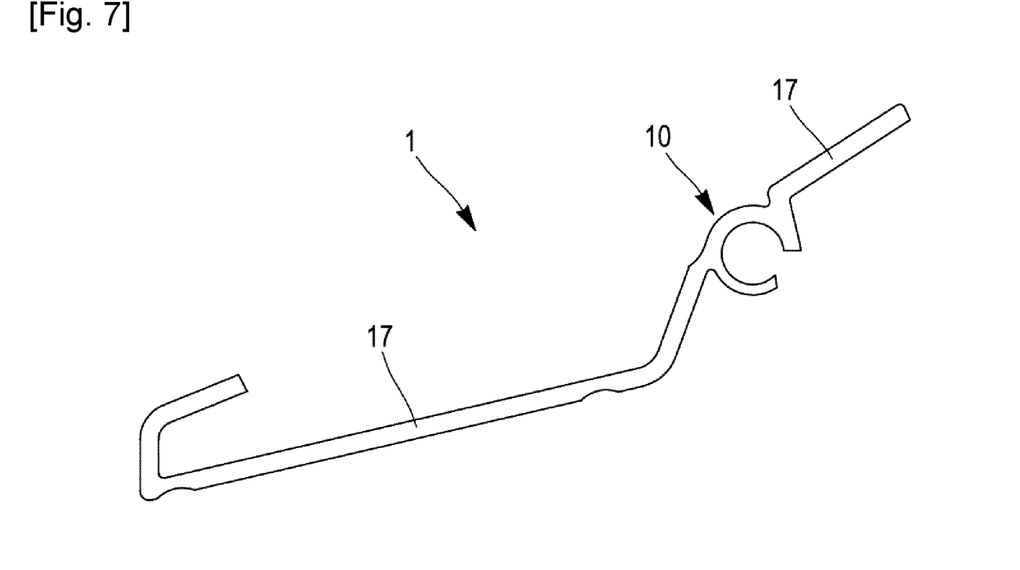
FIG. 7 is a cross-section view of a second embodiment of the guide rail in accordance with the invention.
Figure 8:
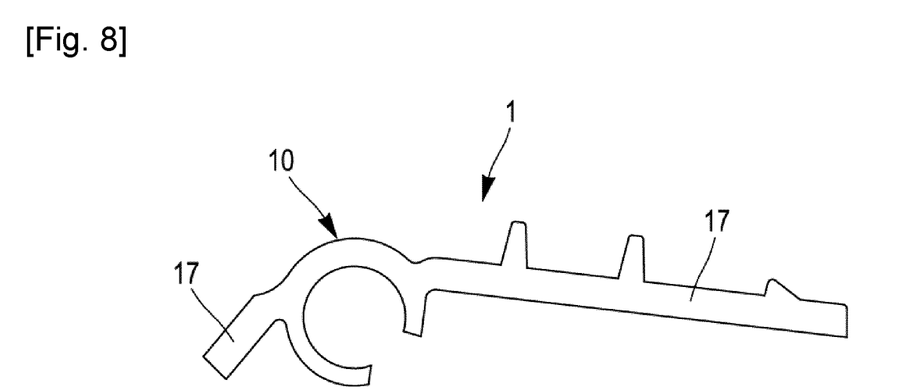
FIG. 8 is a cross-section view of a third embodiment of the guide rail in accordance with the invention.

FIGS. 7 and 8 show two possible embodiments of the guide rail 1 that include these wings 17, the latter allowing for the fastening of the guide rail 1 on the uprights of the door of the motor vehicle. The shapes of these wings 17 can vary greatly and are adapted according to the vehicle on which the guide rail 1 has to be mounted.

Figure 9:
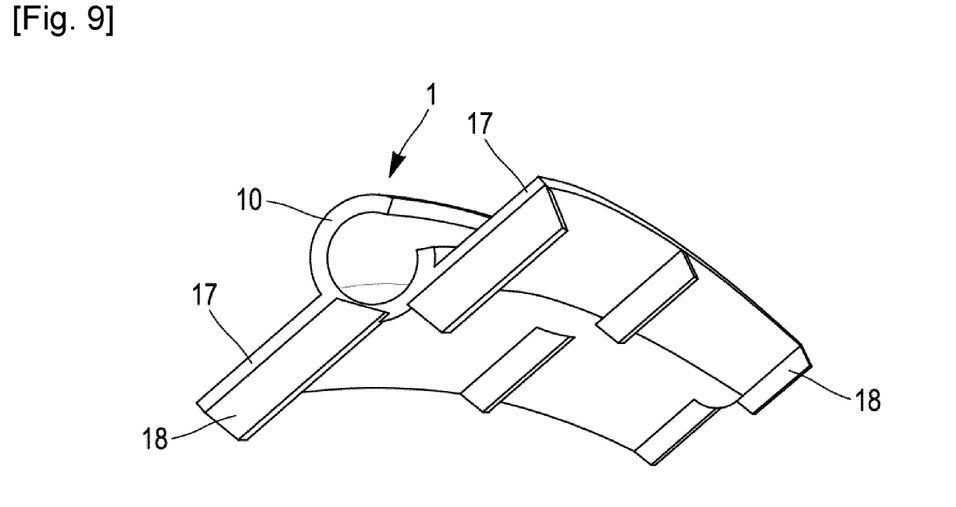
FIG. 9 is a perspective view of a fourth embodiment of the guide rail in accordance with the invention, equipped with retaining tabs.

FIG. 9 shows another example of a guide rail 1, which further comprises wings 17, retaining tabs 18, as a single piece with the wings 17 and of which the role will be detailed hereinafter.

The guide rail 1 in accordance with the invention can be carried out as a whole in a single injected material (that latter able to be composite). It can also be carried out in several injected materials, and in this case, these are different portions of the rail 1 which are carried out in different materials.

By way of a purely illustrative example, if there is a single material the latter can be chosen from polypropylene (PP), polyoxymethylene (POM), acrylonitrile butadiene styrene (ABS), acrylonitrile butadiene styrene/polycarbonate (ABS/PC).

When the rail comprises two different materials, the aforementioned materials can be combined, and even a thermoplastic vulcanizate (TPV) can be added chemically or mechanically compatible with one of the aforementioned materials.

Finally, if the rail comprises for example three materials, for example to carry out three different portions, it is possible for example other than all of the aforementioned materials add poly methyl methacrylate (PMMA), acrylonitrile styrene acrylate (ASA), or styrene acrylonitrile on a support made of acrylonitrile butadiene styrene (ABS) or acrylonitrile butadiene styrene/polycarbonate (ABS/PC).

The invention also relates to an injection moulding device 2 that makes it possible to manufacture the aforementioned rail 1 and which shall now be described in more detail in liaison with FIGS. 10 to 13.

Generally, the moulding device 2 in accordance with the invention comprises a mould 3, a device 5 for injecting under pressure plastic material inside said mould and a device 6 for extracting the male portion of this mould outside the female portion of the latter.

The mould 3 shall now be described in liaison with FIGS. 11 and 12. It comprises a female portion 30 and a male portion 31, that together delimit and between them, a moulding cavity 4 the shape of which corresponds to that of the contour of the guide rail 1 to be manufactured.

The moulding cavity 4 comprises a portion 40, referred to as "moulding cell", the shape of which corresponds to that of the curved tubular profile 10 of the guide rail.

Figure 12:
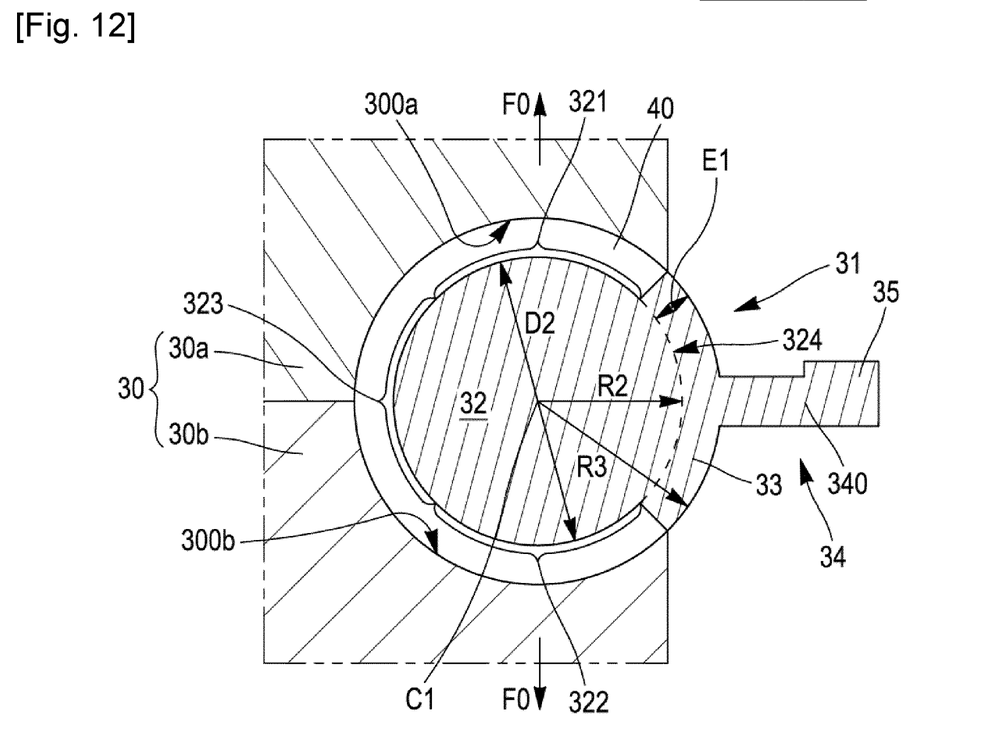
FIG. 12 is a diagrammatical cross-section view of a possible embodiment of the male portion and of a portion of the female portion of the mould belonging to the moulding device in accordance with the invention.
Figure 13:
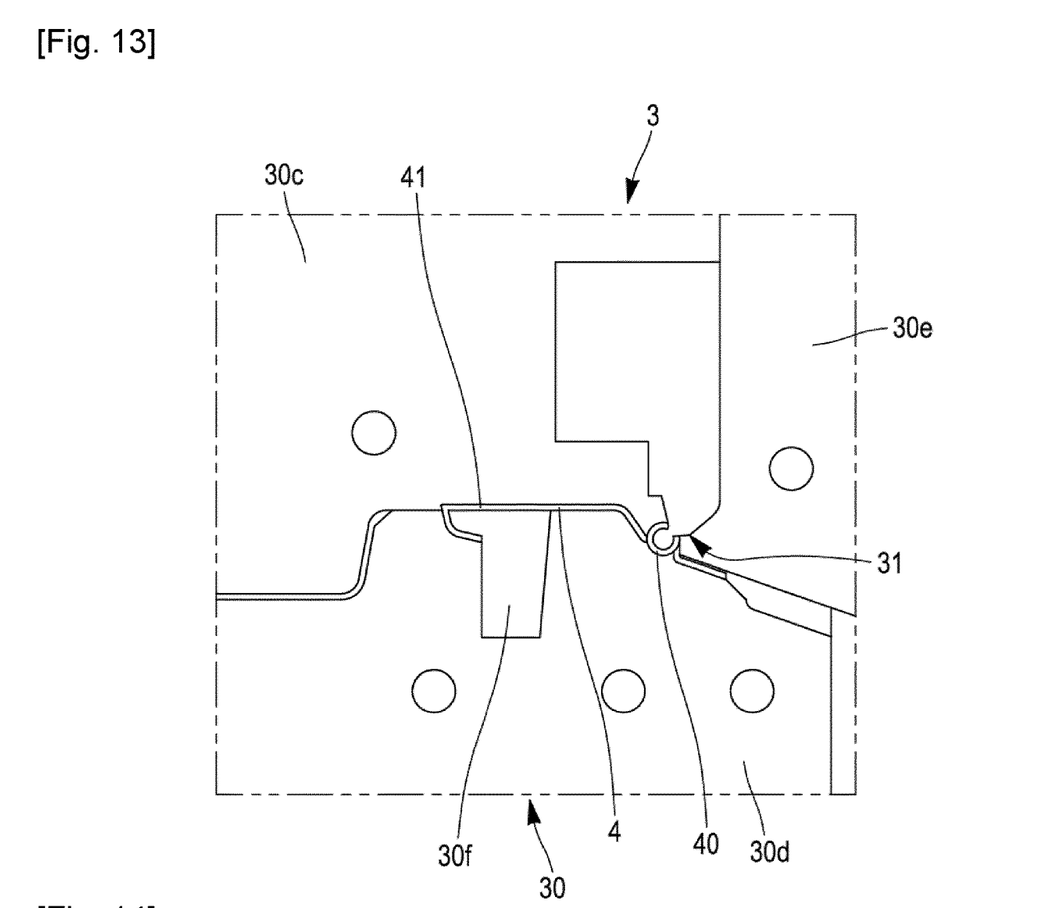
FIG. 13 is a cross-section view of an embodiment of the mould of the moulding device according to the invention.

In other terms, a minima, the moulding cavity 4 can comprise only the moulding cell 40, as shown in the example of FIG. 12. Inversely, as shown on the example of FIG. 13, the moulding cavity 4 can comprise the aforementioned moulding cell 40 as well as other portions 41 used to form the wings 17 as a single piece with the profile 10. FIG. 13 shows for example the mould that makes it possible to obtain the rail 1 shown in FIG. 7.

The male portion 31 of the mould is used to make the recess 11 of the rail 1, as well as the longitudinal slot 12.

The female portion 30 of the mould is used to manufacture the outer surface of the tubular profile 10 and the wings 17, as well as the tabs 18 when they exist.

In the embodiment shown in FIG. 12, the female portion 30 of the mould 3 comprises two parts 30a and 30b, mobile and able to be separated from one another (arrows F0), in order to allow for the unmoulding of the rail 1. Each part 30a, 30b of the mould thus comprises a hollow zone 300a, 300b making it possible to make the outer surface of the profile 10.

The zone 300a has for example a cross-section in an arc of circle and a curved and concave shape over its entire length in such a way as to make the convex portion 14 of the profile 10 of the rail 1. Inversely, the zone 300b has a cross-section in an arc of circle and a curved and convex shape over its entire length, in such a way as to form the concave zone 13 of the rail 1. Note that when the profile 10 is straight, the zones 300a and 300b of the mould have a cross-section in an arc of a circle but are straight over their entire length.

The mould 3 could of course comprise more than two parts.

Thus, in the embodiment shown in FIG. 13, the female portion 30 of the mould comprises four parts, referenced as 30c, 30d, 30e and 30f. The parts 30c, 30d, 30e and 30f thus make it possible to manufacture not only the tubular profile 10 but also the wings 17.

In this embodiment, it can be seen for example that the part 30f is a drawer that is mobile in translation in a direction perpendicular to the plane of the cross-section of the mould shown in FIG. 13, in such a way that the curved end of the wing 17 which has draft angles can be unmoulded.

It is easily understood that the number of parts that form the female portion 30 of the mould 3 can be adapted according to the guide rail to be produced.

The male portion of the mould that makes it possible to obtain a rail provided with a curved profile 10 shall now be described.

Advantageously, and as can be seen in FIG. 12, the male portion 31 of the mould comprises a core 32 for the formation of the recess 11 of the rail 1, an intermediate part 33 of the formation of the longitudinal slot 12 and a cooperation part 34 with the extraction device 6. Preferably, the core 32, the intermediate part 33 and the cooperation part 34 are of a single piece.

The core 32 is curved in the shape of an arc of a circle, this arc of a circle being inscribed in a plane. In the embodiment shown in FIGS. 10 to 13, the core 32 has the shape of a portion of a torus of circular cross-section. The diameter D2 of the cross-section of the torus is equal to that of the inner diameter D1 of the recess 11 of the profile 10.

Figure 11:
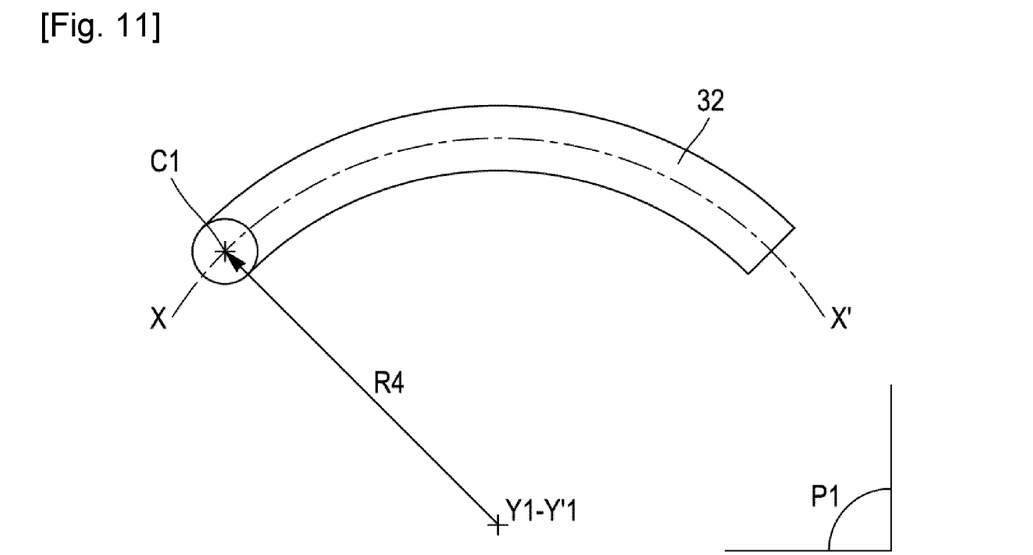
FIG. 11 is a diagram of a possible embodiment of the core of the male portion of the mould belonging to the moulding device in accordance with the invention.

Furthermore, as can be seen in the diagram of FIG. 11, the core 32 in the shape of a portion of a ring has a central axis Y1-Y'1 of the ring and a radius R4 that joins this axis Y1-Y'1 to the centre C1 of the cross-section of said core 32.

The core 32 is curved in such a way that it has on its outer surface a convex longitudinal zone 321 (convex over its length), an opposite concave longitudinal zone 322 (concave over its length) and two lateral longitudinal zones 323, 324, with each one of them joining the convex zone 321 to the concave zone 322.

The core 32 is extended towards the outside either from its concave zone 322, or from one of its two lateral zones (here the zone 324) and over at least one portion of its length, by said intermediate part 33.

The cross-section of said intermediate part 33 has for example a shape of an arc of a circle of which the inner radius R2 corresponds to that of the circular cross-section of the core 32, and of which the outer radius R3 corresponds to that of the circle that delimits the moulding cell 40. In other terms, the thickness E1 of this intermediate portion 33 corresponds to the thickness E2 of the guide rail to be obtained (see FIG. 3).

Figure 10:
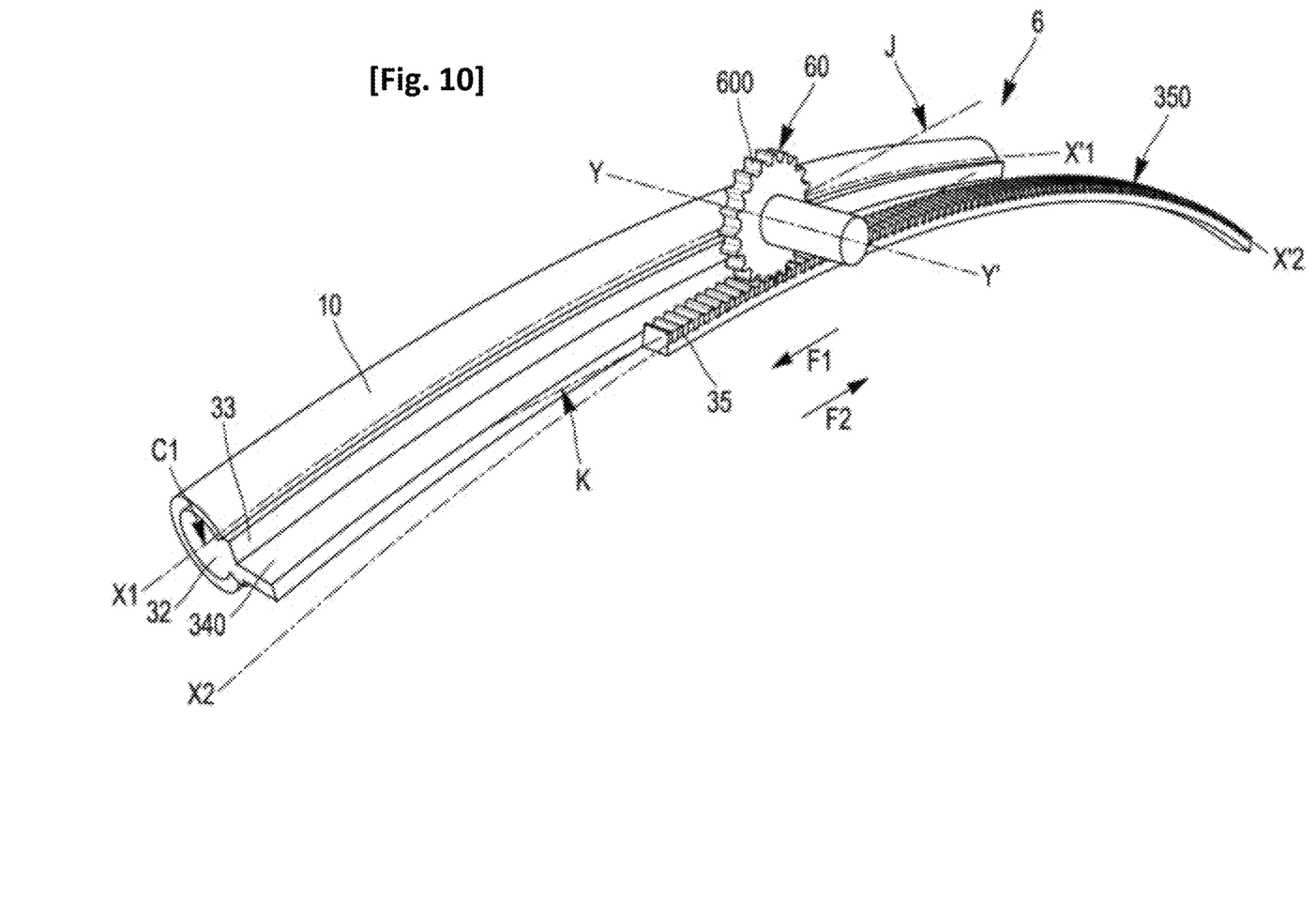
FIG. 10 is a diagrammatical view in perspective of the operating principle of the extraction device of the injection moulding device in accordance with the invention.

Furthermore, and over its entire length, and as appears better in FIG. 10, the intermediate part 33 is curved in such a way as to follow the curvature of the core 32.

The male portion of the mould that makes it possible to obtain a rail provided with a straight profile 10 shall now be described. It differs from what has just been described in that the core 32 is straight and of a circular cross-section or not and in that the intermediate part 33, which protrudes along the core 32, is also straight.

Figure 14:
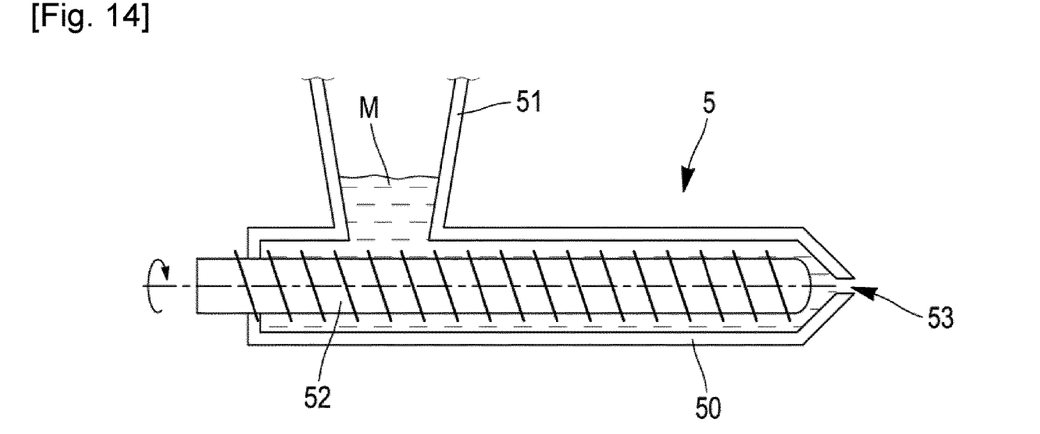
FIG. 14 is a diagrammatical view of an embodiment of the injection device under pressure of the moulding device in accordance with the invention.

A possible embodiment of the injection device under pressure 5 shall now be described in liaison with FIG. 14.

Conventionally, the device 5 allows for the injection under pressure of plastic material inside the moulding cavity 4.

The injection device 5 comprises a body 50, supplied with plastic material M by a hopper 51. A worm screw 52 is disposed inside the body 50. It is driven in rotation by a motor (not shown in the figures), in such a way as to push the plastic material under pressure through an outlet orifice 53, itself connected to the moulding cavity 4.

The extraction device 6 makes it possible to displace the core 32 outside the moulding cell 40, from one of the two ends of the latter.

An embodiment of the extraction device 6 shall now be described in liaison with FIG. 10. This device 6 is suitable in the case where the core 32 is curved. In this case, the device 6 makes it possible to displace the core 32 in a trajectory in the shape of an arc of a circle of the same radius as the aforementioned radius R4 of the arc of a circle of the core 32.

The cooperation part 34 comprises a tab 340, curved along its length, in such a way that it has a shape of an arc of a circle, this circle being coaxial to the central axis Y1-Y'1 of the ring of which the core 32 constitutes a portion. This tab 340 has on its upper face a series of teeth 35 that together form a rack 350.

The extraction device 6 comprises a pinion 60 driven in rotation by a displacement device not shown in the figures. This displacement device can for example be a rotating cylinder or a geared motor.

The pinion 60 is disposed in such a way that its axis of rotation Y-Y' is parallel to the axis Y1-Y'1 of the ring forming the core 32 of the male portion. The teeth 600 of this pinion 60 mesh with the teeth 35 of the rack 350.

The rotation of the pinion 60 drives the displacement of the rack 350 and therefore jointly that of the core 32. This displacement is carried out in a trajectory in the shape of an arc of a circle of the same radius as the radius R4 of the core 32, thus causing the extraction of the core 32 outside the moulding cell 40 of the mould. The rotation in the inverse direction of the pinion inversely makes it possible to bring back into position the core 32 inside the moulding cell 40. As can be seen in FIG. 10, the rack 350 exceeds in length at one of the ends of the core 32 in such a way as to be able to fully extract the core 32 outside the rail 10.

Preferably, and as can be seen in FIG. 10, the pinion 60 is disposed at half or substantially half of the length of the core 32. This makes it possible to have a circular extraction movement that balances the unmoulding forces.

The extraction force exerted by the pinion 60 is exerted in a straight direction K tangent to the direction of bending X2-X'2 of the rack 350 and in the direction of the arrow F1. This extraction force compensates the unmoulding force that is exerted in a straight direction J tangent to the extraction trajectory in the shape of an arc of a circle X1-X1', X1-X1' being inscribed in the plane P1 and X1-X1' also corresponding to the curved central longitudinal axis of the core 32. When the core 32 is in the profile 10, note that the arcs of circle X1-X'1 and X-X' are confounded. The directions J and K are parallel.

When the core 32 is straight, the extraction device 6 differs in that the tab 34 as well as the rack 350 are straight and parallel to the core 32. Furthermore, the extraction is also carried out in a straight manner.

The method of moulding in accordance with the invention shall now be described. It comprises a first step that consists in injecting plastic material under pressure using the device 5 inside the cavity 4 of the mould 3 of the moulding device in accordance with the invention.

The following step consists in hardening this plastic material, for example by heating.

When the plastic material has hardened and the guide rail 1 is formed, the extraction device 6 is actuated in such a way that the displacement device drives the pinion 60 in rotation. This pinion meshes with the rack 350 and causes the displacement of the core 32 outside the cavity 40 and also outside the recess 11 of the profile 10 of the guide rail 1 (see arrow F1 in FIG. 10).

When they are present, the retaining tabs 18 perpendicular to the wings 17 make it possible to retain the moulded rail 1 in the female portion 30 of the mould during the displacement of the male portion 31.

Advantageously, the different portions that form the female portion 30 of the mould are then separated in order to allow for the unmoulding of the guide rail 1.

Then, by driving the pinion 60 in rotation in the inverse direction, the core 32 can be brought back to the initial position inside the cavity 40 (arrow F2), for the moulding of another guide rail 1.

The invention claimed is:

1. A method of injection moulding of a guide rail of a guide shoe fastened to a sliding window of a motor vehicle door, the guide rail having no draft angles, wherein the guide rail is made from an injected plastic material, wherein the guide rail comprises at least one portion having a shape of a tubular profile, which has a recess over the entire length of the tubular profile and which is provided over at least one portion of the length of the tubular profile with a longitudinal slot and wherein the tubular profile is curved in a shape of an arc of a circle, the arc of a circle being inscribed in a plane, so that an outer surface of the tubular profile has a concave longitudinal zone, an opposite convex longitudinal zone and two opposite lateral longitudinal zones, with each lateral longitudinal zone extending from the concave longitudinal zone to the opposite convex longitudinal zone, and wherein the longitudinal slot extends along one of the two opposite lateral longitudinal zones or along the concave longitudinal zone, wherein the method comprises the steps of:

providing an injection moulding device comprising:

a mould comprising a male portion and a female portion together delimiting a moulding cavity the shape of which corresponds to that of a contour of the guide rail to be moulded, the guide rail to be moulded having no draft angles, comprising at least one portion having a shape of a tubular profile, which has a recess over an entire length of the tubular profile and which is provided over at least one portion of the length of the tubular profile with a longitudinal slot, the tubular profile being curved in a shape of an arc of a circle, the arc of a circle being inscribed in a plane, so that an outer surface of the tubular profile has a concave longitudinal zone, an opposite convex longitudinal zone and two opposite lateral longitudinal zones, with each lateral longitudinal zone extending from the concave longitudinal zone to the opposite convex longitudinal zone, and the longitudinal slot extending along one of the two opposite lateral longitudinal zones or along the concave longitudinal zone, the female portion of the mould comprising at least two parts, the moulding cavity comprising a moulding cell with two ends, the shape of which corresponds to that of the at least one portion of the guide rail having the shape of the tubular profile, the male portion of the mould comprising at least one core for the formation of the recess of the guide rail and an intermediate part for the formation of the longitudinal slot of the guide rail, the core being curved in the shape of an arc of a circle inscribed in a plane, a device for injecting under pressure inside the moulding cavity, plastic material configured to manufacture the guide rail, and an extraction device for extracting the at least one core of the male portion outside the moulding cell of the mould, the extraction device being configured to displace the core from one of the two ends of the moulding cell in a trajectory of an arc of a circle of the same radius as a radius of the arc of a circle of the core in order to extract the core from one of the two ends of the moulding cell, injecting at least one plastic material under pressure inside the moulding cavity of the mould of the injection moulding device, hardening the at least one plastic material, actuating the extraction device to slide the male portion of the mould outside the female portion of the mould to extract the male portion from the female portion; and separating the at least two parts of the female portion of the mould to unmould the guide rail thus obtained.

2. The method of injection moulding according to claim 1, wherein an outer surface of the core of the male portion of the mould has a concave longitudinal zone, an opposite convex longitudinal zone and two opposite lateral longitudinal zones, with each lateral longitudinal zone of the core extending from the concave longitudinal zone of the core to the opposite convex longitudinal zone of the core and wherein either the concave longitudinal zone of the core, or one of the two opposite lateral longitudinal zones of the core extends outwards and over at least one portion of the length of the core by the intermediate part.

3. The method of injection moulding according to claim 1, wherein the recess of the guide rail has a shape of a portion of a torus with a circular cross-section and wherein the core of the male portion of the mould has a shape of a cross-section circular torus the diameter of which corresponds to the inner diameter of the recess of the profile of the guide rail to be moulded.

4. The method of injection moulding according to claim 1, wherein the tubular profile of the guide rail has a radius of curvature comprised between 300 mm and infinity.

5. The method of injection moulding according to claim 1, wherein the tubular profile of the guide rail comprises at least one longitudinal wing extending from the outer surface of the tubular profile to form a single piece with the tubular profile and wherein the moulding cavity comprises portions used to form the at least one longitudinal wing of the guide rail.

6. The method of injection moulding according to claim 1, wherein the at least one plastic material is one composite material.

7. The method of injection moulding according to claim 1, wherein the at least one plastic material is chosen among polypropylene, polyoxymethylene, acrylonitrile butadiene styrene, acrylonitrile butadiene styrene/polycarbonate, poly methyl methacrylate, acrylonitrile styrene acrylate, or styrene acrylonitrile.

8. The method of injection moulding according to claim 1, wherein the male portion of the mould further comprises a cooperation part which cooperate with the extraction device, the core extending outwards and over at least one portion of its length by the intermediate part of the formation of the slot of the guide rail, the thickness of the intermediate part corresponding to the thickness of the guide rail to be obtained.

9. The method of injection moulding according to claim 8, wherein the cooperation part comprises a rack with teeth, wherein the extraction device comprises a pinion driven in rotation by a displacement device, the pinion meshing with the teeth of the rack, to displace the rack, and jointly the core of the male portion of the mould, so that the core exits from the moulding cell.

10. The method of injection moulding according to claim 9, wherein the rack with teeth is in a shape of an arc of a circle, wherein the pinion is disposed in such a way that the axis of rotation of the pinion is parallel to a central axis of the circle of the core in the shape of an arc of a circle of the male portion of the mould and wherein the pinion meshes with the teeth of the rack in such a way as to displace the rack and jointly the core in a trajectory in the shape of an arc of a circle of the same radius as the radius of the arc of the circle of the core that joins the central axis of the circle of the core to the centre of the cross-section of the core, in such a way as to cause the core to exit outside the moulding cell.

* * * * *